United States Patent
Tong et al.

(10) Patent No.: US 12,395,525 B2
(45) Date of Patent: Aug. 19, 2025

(54) DETECTION OF SPOOFING OR JAMMING ATTACKS IN WIRELESS COMMUNICATION SYSTEM

(71) Applicant: SAMSUNG ELECTRONICS CO., LTD., Suwon-si (KR)

(72) Inventors: Fei Tong, Bassingbourn (GB); Ziming He, London (GB); Jacob Sharpe, Foxton (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 489 days.

(21) Appl. No.: 17/455,485

(22) Filed: Nov. 18, 2021

(65) Prior Publication Data

US 2022/0191245 A1    Jun. 16, 2022

(30) Foreign Application Priority Data

Dec. 10, 2020  (KR) .................. 10-2020-0172608

(51) Int. Cl.
*H04L 9/40* (2022.01)
*G06F 18/214* (2023.01)
*G06F 18/2413* (2023.01)
*G06N 3/04* (2023.01)

(52) U.S. Cl.
CPC ........ *H04L 63/1466* (2013.01); *G06F 18/214* (2023.01); *G06F 18/24147* (2023.01); *G06N 3/04* (2013.01); *H04L 63/1416* (2013.01); *H04L 63/1425* (2013.01)

(58) Field of Classification Search
CPC ............. H04L 63/1466; H04L 63/1416; H04L 63/1425; H04L 25/022; G06F 18/24147; G06F 18/214; G06N 3/04; G06N 3/08; H04W 12/12; H04W 12/79; H04W 12/122

See application file for complete search history.

(56) References Cited

U.S. PATENT DOCUMENTS

| | | |
|---|---|---|
| 8,531,332 B2 | 9/2013 | Gum et al. |
| 9,386,030 B2 | 7/2016 | Vashist et al. |
| 9,800,612 B2 | 10/2017 | Harvey et al. |
| 9,958,549 B2 | 5/2018 | Psiaki et al. |
| 11,947,622 B2 * | 4/2024 | Xu .......................... G06F 17/18 |

(Continued)

OTHER PUBLICATIONS

Zhou, et al., "Pilot Contamination for Active Eavesdropping", IEEE Transactions on Wireless Communications, vol. 11, No. 3, Mar. 2012, pp. 903-907.

(Continued)

*Primary Examiner* — Ali S Abyaneh
(74) *Attorney, Agent, or Firm* — Morgan, Lewis & Bockius LLP

(57) ABSTRACT

A method for detecting a modification, due to an interferer, of a wireless channel between a transmitting device and a receiving device. First and second samples of channel frequency response (CFR) of the wireless channel are measured within a time interval less than or equal to a pre-established static time interval throughout which the wireless channel is expected to exhibit a static characteristic in an environment without any interferer. An interferer is detected to have modified the wireless channel when a similarity condition reflecting a degree of similarity between the first and second CFR samples is not satisfied.

15 Claims, 6 Drawing Sheets

(56) References Cited

U.S. PATENT DOCUMENTS

| | | | |
|---|---|---|---|
| 2008/0250498 A1* | 10/2008 | Butti | H04W 12/122 |
| | | | 726/23 |
| 2017/0103674 A1* | 4/2017 | Sadeh-Koniecpol | |
| | | | G06F 21/566 |
| 2017/0188235 A1 | 6/2017 | Xiao et al. | |
| 2018/0295519 A1* | 10/2018 | Nandha Premnath | |
| | | | H04L 63/1425 |
| 2019/0098048 A1 | 3/2019 | Lumezanu et al. | |
| 2019/0129041 A1 | 5/2019 | Lyusin | |
| 2020/0014526 A1 | 1/2020 | Hammerschmidt et al. | |
| 2020/0204588 A1 | 6/2020 | Harvey et al. | |
| 2020/0319301 A1 | 10/2020 | Qiu et al. | |

OTHER PUBLICATIONS

Amariucai, et al., "Half-Duplex Active Eavesdropping in Fast Fading Channels: A Block-Markov Wyner Secrecy Encoding Scheme", arXiv:1002.1313v1 [cs.IT] Feb. 5, 2010. 17 pages.

Kapetanovic, et al., "Physical Layer Security for Massive MIMO: An Overview on Passive Eavesdropping and Active Attacks", arXiv:1504.07154v1 [cs.IT] Apr. 27, 2015, 17 pages.

Huang, et al., "Pilot Spoofing Attack by Multiple Eavesdroppers", arXiv:1807.08905v1 [cs.IT] Jul. 24, 2018, 14 pages.

Wang, et al., "Multiple Antennas Secure Transmission under Pilot Spoofing and Jamming Attack", arXiv:1801.04104v1 [cs.IT] Jan. 12, 2018, 16 pages.

Xiong, et al., "An Energy-Ratio-Based Approach for Detecting Pilot Spoofing Attack in Multiple-Antenna Systems", IEEE Transactions on Information Forensics and Security, vol. 10, No. 5, May 2015, pp. 932-940.

\* cited by examiner

DETECTION OF SPOOFING OR JAMMING ATTACKS IN WIRELESS COMMUNICATION SYSTEM

CROSS REFERENCE TO RELATED APPLICATION

This application claims priority under 35 U.S.C. § 119 to Korean Provisional Application No. 10-2020-0172608, filed Dec. 10, 2020 in the Korean Intellectual Property Office, the content of which is incorporated herein by reference in its entirety.

TECHNICAL FIELD

The present disclosure relates generally to wireless communications security and more particularly to techniques for detecting spoofing and/or jamming attacks with respect to a wireless channel of a wireless communication system.

DISCUSSION OF THE RELATED ART

Physical layer security techniques have attracted significant attention as an option for securing wireless communications. A malicious attacker ("interferer") may attempt to eavesdrop, access sensitive information, and/or disrupt communications between two wireless devices using, e.g., spoofing or jamming. In a spoofing attack known as pilot contamination (discussed in [1] of References section below), an interferer may attempt to improve a signal from the transmitting device towards the interferer and degrade the signal towards the legitimate user (LU) receiving device. To this end, the interferer may attempt to contaminate a pilot-based sounding/estimation procedure with respect to a wireless channel between the two devices. If successful, the transmitting device (e.g., an access point (AP) in WiFi, a master device in Bluetooth, or a base station in a cellular network) may be spoofed into using beamforming to orient its beam towards both the LU and the interferer.

In another attack category known as pilot jamming (discussed in [2]), the transmitted signal from the interferer transmits random noise with the purpose of degrading the signal reception at the LU. This may be done to maliciously degrade communications between the transmitting device and the LU, and/or cause either device to increase the power of its transmitted signal and thereby improve signal reception at the interferer.

Some methods designed to detect and handle such interferer attacks are as follows: In [3], a random training scheme is proposed to detect pilot contamination. The training signal is randomly chosen from a set of phase shift keying (PSK) symbols. This method, however, requires a fundamental change in the set of pilot signal designs as well as the channel estimation process, which is typically undesirable due to increased costs and incompatibility issues. In [4], an energy ratio detector is described to detect pilot contamination. The method assumes the spoofing attack will decrease the signal reception at the LU due to a transmit beamforming change. Thus, the detector explores asymmetry of received signal power levels at the beamformer and the LU. However, the method has the drawback of an additional signaling procedure. In [5], the pilot contamination and jamming are considered together with the LU randomly selecting a training signal from a pre-defined set with multiple orthogonal pilot sequences. This technique likewise consumes further resources associated with additional signaling.

SUMMARY

Embodiments of the inventive concept may leverage the expected characteristics of a slowly changing propagation channel (a "static" channel) to detect, in real time or nearly real time, an opportunistic attack on the channel by an interferer device.

In an aspect of the inventive concept, a method is provided for detecting a modification, due to an interferer, of a wireless channel between a transmitting device and a receiving device. First and second samples of channel frequency response (CFR) of the wireless channel are measured within a time interval less than or equal to a pre-established static time interval. The static time interval is an interval throughout which the wireless channel is expected to exhibit a static characteristic in an environment without any interferer. The method detects that the interferer has modified the wireless channel when a similarity condition reflecting a degree of similarity between the first and second CFR samples is not satisfied.

Examples of developing the similarity condition and determining whether the similarity condition is satisfied include operations employing a cross-correlation algorithm; a nearest neighbor algorithm; and/or a supervised neural network.

In another aspect, a method for detecting a modification of a wireless channel includes a training phase in which a training procedure involves communicating training signals between transmitting and receiving devices at frequencies distributed over an operating frequency band in the absence of an interferer. At the receiving device, the training signals are sampled at each of the frequencies to obtain samples of channel frequency response (CFR) over time. A static time interval is determined based on the CFR samples. A CFR similarity condition is determined for a static characteristic of the wireless channel based on the CFR samples. During an operational phase, a modification of the wireless channel due to the interferer is detected when the CFR similarity condition is not satisfied with respect to CFR samples taken during a time interval less than or equal to the static time interval.

In yet another aspect, a receiving device includes at least one antenna; a transceiver; and at least one processor configured to execute any of the methods summarized above.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with a second label that distinguishes among the same/similar elements (e.g., 135_1, 135_2). However, if a given description uses only the first reference label (e.g., 135) it is applicable to any one of the same/similar elements having the same first reference label irrespective of the second label.

DETAILED DESCRIPTION OF EMBODIMENTS

The following description, with reference to the accompanying drawings, is provided to assist in a comprehensive understanding of certain example embodiments of the inventive concept disclosed herein for illustrative purposes. The description includes various specific details to assist a person of ordinary skill in the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

Existing interferer detection techniques such as those described in the Related Art discussion above may consider that the interferer is continually spoofing a channel sounding procedure (i.e., a propagation channel testing process) over a relatively long observation time. Embodiments of the inventive concept, on the other hand, consider the case in which an interferer attacks opportunistically—e.g., the interferer only transmits an interference signal sporadically over an observation time. In an example implementation within an indoor environment, the wireless propagation channel usually changes slowly when there is no active interferer. Such a slow changing channel may be said to have a "static characteristic" or to have a property of "channel continuality". This property can be utilized in embodiments of the inventive concept to detect an interferer attack, the moment it occurs, when the channel estimate changes suddenly due to the attack.

Figure 1:
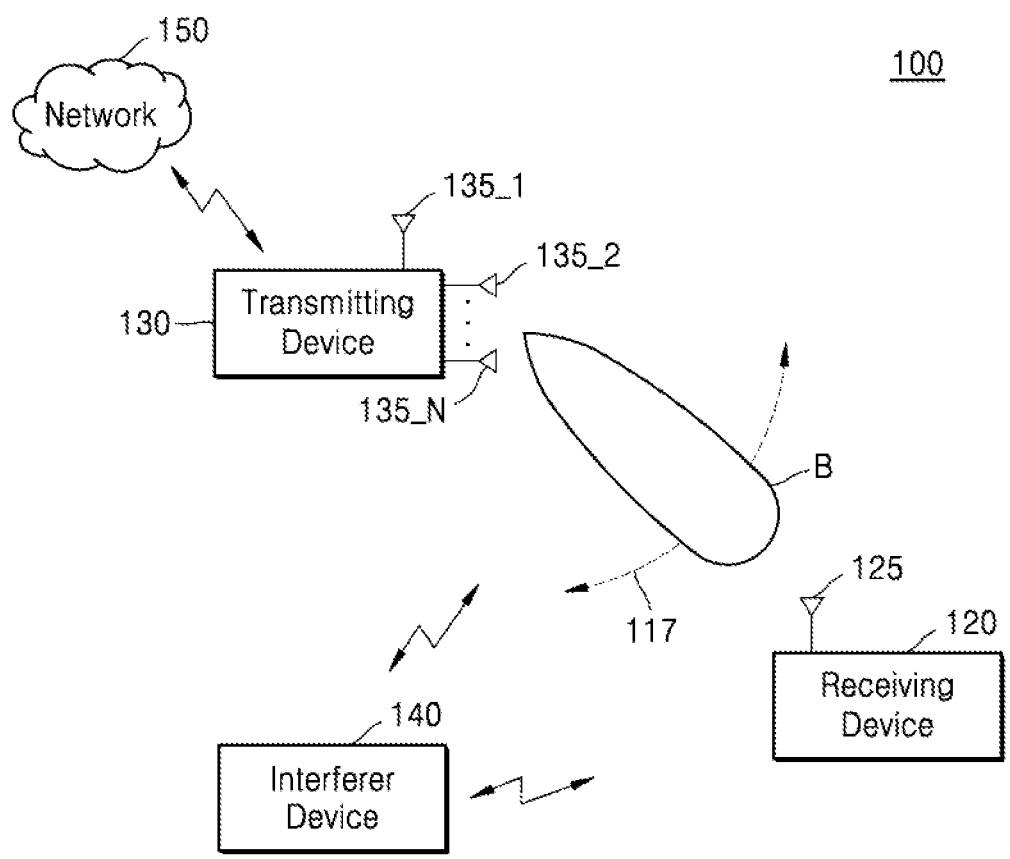
FIG. 1 illustrates a wireless communication system environment with an interferer, in which wireless devices according to embodiments may operate.

FIG. 1 illustrates an environment of a wireless communication system with an interferer, in which wireless devices according to embodiments may operate. Wireless communication system 100 may be a system operating in accordance with any suitable protocol, in an environment exhibiting a slowly changing channel between a transmitting device 130 and a receiving device 120. (Embodiments to detect interferers discussed below may be unsuitable for application to channels that change too fast, such as one between a cellular network base station and a high speed vehicle.) Some protocol examples include local area network standards such as Bluetooth and IEEE 802.11 (WiFi), and wide area/cellular network protocols such as 3G, 4G or 5G.

Transmitting device 130 and/or receiving device 120 may include the capability to detect interferers according to methods described hereafter, and may generally be any devices capable of wirelessly communicating signals/information with each other, bidirectionally or unidirectionally. Transmitting device 130 may be a controlling device in system 100 that may communicate concurrently with multiple receiving devices 120. Some examples of transmitting device 130 include a master device in Bluetooth, an Access Point (AP) in WiFi, and a base station in a cellular network (sometimes called a node B or an eNode B). Receiving device 120 may be any device that operates according to the protocol of transmitting device 130. For instance, receiving device 120 may be configured as a slave device in Bluetooth, a station (STA) in WiFi, or a wireless terminal or "user device" in a cellular network. In peer-to-peer networks, some examples of a receiving device 120 may also include the capability of operating as a transmitting device 130, and vice versa. For simplicity of explanation in the discussion below, it will be assumed that transmitting device 130 is a controlling device in system 100, e.g., a device that transmits pilot signals enabling detection of its presence and availability by receiving device 120, provides synchronization signals to receiving device 120, assigns frequencies/time slots to receiving device 120, etc. Receiving device 120 may be assumed in the following discussion to operate with frequencies, time slots, power levels, etc. permitted under the control of transmitting device 130. Receiving device 120 may periodically transmit feedback signals back to transmitting device 130 to report propagation channel conditions based on measurements of training signals or traffic signals received from transmitting device 130. Receiving device 120 may be referred to as a legitimate user (LU).

Transmitting device 130 may include a single antenna 135 or multiple antennas 135_1 to 135_N (N=2 or more) for communication with receiving device 120. Transmitting device 130 may also communicate wirelessly or in a wired manner with a local area or wide area network 150 such as the Internet, to provide information to receiving device 120. In embodiments with multiple antennas 135_1 to 135_N, transmitting device 130 may include beamforming capability to drive the antennas 135_1 to 135_N together as a steerable phased array. Thus, a beam B is formed that may be steered 117 to optimize the signal power at receiving device 120. Receiving device 120 may similarly include just a single antenna 125, or in other cases, multiple antennas 125 that may also be driven together to form a steerable beam. (Transmitting and receiving devices 130 and 120, when equipped with multiple antennas, may additionally or alternatively be configured with a multiple input multiple output (MIMO) based feed network coupled to the antennas to transmit/receive signals over several multipath spatial channels concurrently.)

In accordance with some protocols, a pilot-based sounding/estimation procedure may be carried out with respect to the wireless propagation channel between transmitting and receiving devices 130 and 120. During this procedure, an interferer device 140 may initiate a "man in the middle attack". For instance, if interferer device 140 launches a pilot contamination spoofing attack that goes undetected, transmitting device 130 may react by steering the beam B away from an optimal pointing direction at receiving device 120 and closer to interferer device 140. This may reduce power/quality of received signal at receiving device 120 and improve it at interferer device 140. Similarly, if interferer device 140 initiates a jamming attack by outputting a high noise level, signal reception at receiving device 120 may be degraded, which may cause transmitting device 130 to increase its signal power and thereby improve the signal towards interferer device 140. Embodiments described below may be designed to detect such attacks in real time or nearly real time, whereupon countermeasures may be promptly taken.

Figure 2A:
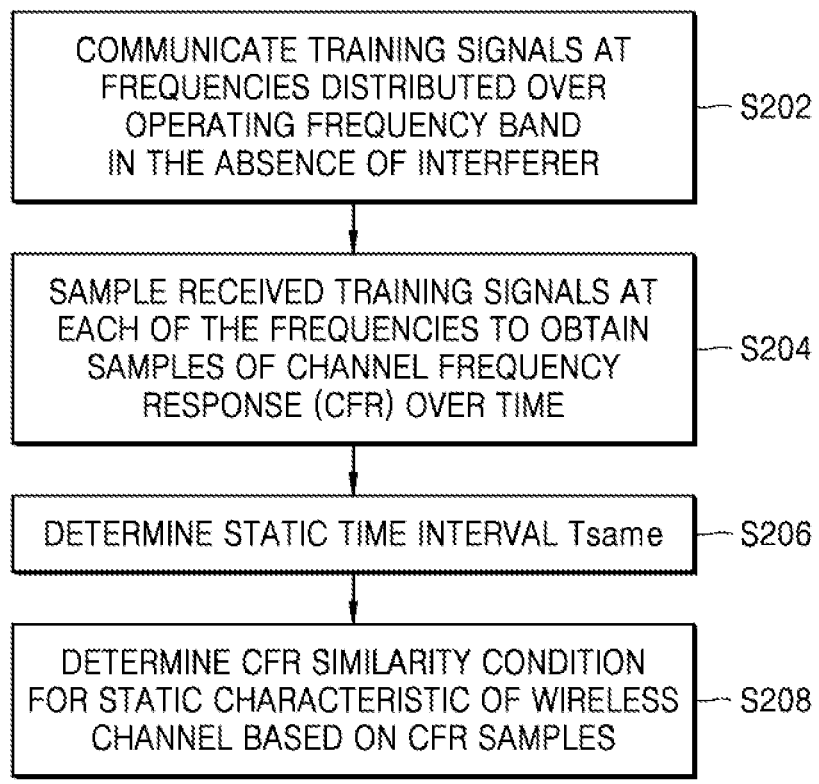
FIG. 2A is a flow diagram depicting example operations in a training phase of a method of detecting an interferer according to an embodiment.

FIG. 2A is a flow diagram depicting example operations in a training phase of a method of detecting an interferer according to an embodiment. The training phase may provide a "static time interval" Tsame and one or more channel frequency response (CFR) similarity conditions to be used in an operational phase (e.g., the operations of FIG. 2B) of the interferer detection method. A channel frequency response of a propagation channel between a transmitting and receiving device (the end points of the channel) may be understood as the channel's overall effect on a signal propagating over the channel, as a function of frequency. CFR metrics may include attenuation, noise, and multipath fading. CFR metrics may be averaged over short sampling periods (e.g., p1, p2 of FIG. 3) to take into account variations in signal levels caused by multipath fading and noise. CFR may be understood as a two dimensional (2D) matrix, one dimension being time and the other frequency. In orthogonal frequency division multiplexing (OFDM) systems (e.g., WiFi/cellular) there are multiple subcarriers, each carrying a portion of a data set, and CFR may be defined individually and/or collectively for all of the subcarriers. In embodiments herein, CFR may be considered just in terms of amplitude, without considerations of phase, since phase is affected by other factors such as phase noise in the receiver unrelated to the wireless channel itself.

Training signals may first be communicated between transmitting device 130 and receiving device 120 in an environment without an interferer (operation S202). The training signals may be any known signals, such as pilot signals in WiFi or handshake signals in Bluetooth. These signals may be generated at frequencies distributed over an operating frequency band to be later used for control and traffic signals. The training signals, which may be modulated in the same manner as subsequent traffic/pilot/control signals, are transmitted from transmitting device 130 to receiving device 120, or vice versa. The training signals may be transmitted either at one carrier frequency at a time in a sequence, or, at two or more frequencies simultaneously by generating sub-carriers using an OFDM technique or the like. The received training signals may then be sampled at each of the frequencies to obtain samples of CFR over time (S204). For instance, in a WLAN application, one dimensional (1D) data signals (discussed later) may be obtained from CFR estimation using training symbols in an IEEE 802.11 WiFi preamble, such as L-LTF and VHT-LTF.

In an example, to ensure there is no interferer present, the training phase may be performed in an anechoic chamber or other shielded environment with a simulation of the actual application environment within which devices 120 and 130 communicate. The simulation may include movement of one or both devices 120 and 130 (relative to each other) and/or movement of objects situated between the devices 120, 130 at speeds consistent with the application, e.g., pedestrian speeds. The simulation may further include a transmission of interference signals towards device 120 and/or 130 emitted by an emulated interferer.

In other examples, it may be assumed that under certain conditions an interferer is not present in the actual operating environment of system 100, whereby the training phase may be performed during such a time. As one example, for the case where devices 120 and 130 are a key fob and a vehicle transceiver, respectively, or vice versa, it may be assumed that no interferer is present within a particular time after the vehicle has traveled and becomes parked, and that the training phase may be performed during that time.

The static time interval Tsame may be determined or obtained (S206). Tsame may be computed based on the training data, or alternatively obtained as a default value from memory. Herein, a static time interval is a time interval throughout which the wireless channel is expected to exhibit a "static characteristic" in the environment without an interferer. A "static characteristic" is a characteristic of a slowly changing channel, the metrics of which may vary from embodiment to embodiment and which may depend on the expected number and speed of objects/devices moving in the particular environment. For example, if wireless communication system 100 is set up in an indoor office environment, transmitting device 130 may be a Bluetooth master device such as a server or desktop computer, and receiving device 120 may be a slave device such as a printer, laptop, desktop computer, smartphone, etc. In a WiFi example, transmitting device 130 may be an AP such as a WiFi router and receiving device 120 is a STA, such as a smartphone, laptop, etc. In the office environment, a small number of people may intermittently walk back and forth through the propagation channel between devices 120 and 130 over a range of speeds, thereby intermittently changing the signal characteristics of the received signal at receiving device 120. In another application example, transmitting device 130 is a vehicle transceiver and receiving device 120 is a key fob (or vice versa) used for unlocking the vehicle, typically using Bluetooth communication. Whenever the key fob is in a certain range of the vehicle, the transceiver and key fob may continually exchange signals. In this case, when a person holding the key fob walks away from or towards the vehicle, the signal characteristics of the received signal at the key fob will change. Despite the intermittent changes in these and other examples, the propagation channel may be considered to have a static characteristic in the environment, where the metrics of the static characteristic, e.g., the range of received signal variables such as signal to noise ratio (SNR), may be learned from the samples of the received training signals. In other words, the static characteristic may be a characteristic definable by normal CFR variations in the absence of an interferer.

Accordingly, metrics for a static channel may be learned from the CFR samples. Data for metrics such as variation of power of received signal with time, variation in SNR with time, and/or variation in bit-to-error ratio (BER) with time, may be gathered based on the CFR samples. Maximum variation in these characteristics for the channel without an interferer may be learned, and this data may be used to determine Tsame. The CFR samples may also be used to determine a CFR similarity condition representing a high degree of similarity between consecutive CFR samples (S208). Similarity at or above the high degree of similarity corresponds to a static characteristic for the wireless channel. The similarity condition can be used later in the operational phase of the method (FIG. 2B) to decide whether a static characteristic exists within a particular time period less than or equal to Tsame. The CFR similarity condition may be based on a difference in CFR from the beginning to the end of the time period. The similarity condition may be a threshold condition associated with a single metric, a condition involving comparisons with two or more metrics, a condition involving a trained neural network, or a combination of sub-conditions associated with multiple respective algorithms. For instance, when a cross-correlation algorithm is used to analyze the CFR difference, a threshold "Y" for the interval Tsame may be determined for quantifying a static characteristic of the wireless channel over Tsame, based on the CFR samples (S208). The threshold Y may be later used during normal data communication sessions (in the method of FIG. 2B described below) as a barometer to detect an interferer. Further exemplary details for setting Tsame using a cross-correlation algorithm are discussed later in connection with FIG. 4.

In examples where Tsame is computed based upon the training data, the computation may consider an expected speed of objects moving between the transmitting and receiving devices 130, 120, and calculate a maximum Doppler frequency shift of signals reflected from objects. For instance, in an indoor office environment example, a maximum Doppler shift may be on the order of 7 Hz and Tsame may be on the order of tenths of a second. The algorithm may also consider relative motion between devices 130 and 120, and an expected communication range between the devices. For instance, an algorithm may assume a certain maximum relative motion between the devices at a pedestrian speed, such that the communication range between consecutive samples will change linearly as a function of the sampling interval. The algorithm may also assume the received signal level will change by a certain amount between the consecutive samples due to the change in range. In this scenario, if Tsame is set too long, the maximum expected change in signal level may be too high. Accordingly, Tsame may be set to a duration consistent with the expected speed of objects in the environment and/or the relative motion between the transmitting and receiving devices.

In some embodiments, the training phase further computes a time interval "Tdiff" and a metric "Mdiff" associated with an interferer. The interval Tdiff may represent a time in which a CFR difference between samples taken at an interval longer than Tdiff appears to have been caused by an interferer, if that CFR difference was actually measured within the interval Tsame. This may be better understood by considering the following example: in the case of a key fob communicating with a vehicle, the user may have placed the key fob inside a building, whereby the key fob is at a fixed range with respect to the vehicle transceiver, and is in continual communication therewith. Thus, the CFR of consecutive signal samples should be highly correlated in the absence of an interferer. If, however, an interferer suddenly appears at a different distance with respect to the vehicle and mimics the signals transmitted by the key fob to gain access to the vehicle, the CFR difference between a first signal transmitted by the interferer, and a last signal transmitted by the key fob (as measured at the vehicle transceiver), will be significant. This considerable, sudden difference in CFR may be a catalyst to detect an interferer. The metric Mdiff may simulate such a CFR difference based on Tdiff. For example, if Tdiff is an interval set longer than Tsame, and a simulation is conducted in which a maximum relative motion between the two devices occurs for the time Tdiff, the CFR difference between samples taken Tdiff apart may be used to establish the metric Mdiff. Later, during the "operational phase" of the method, if CFR differences between samples taken within Tsame are closer to Mdiff than to a metric "Msame" (a metric for CFR difference values expected within Tsame without an interferer), then such an observation may detect the presence of an interferer. This scenario will be discussed later in connection with FIG. 5 (nearest neighbor algorithm example).

Note that Tsame may be obtained during the training phase using a first predetermined threshold th_same, optionally in conjunction with a second predetermined threshold th_diff. Tdiff may be obtained during the training phase using th_diff. For example, if an active emulated interferer is used to transmit interfering signals, a maximum cross-correlation of CFR pairs (within the Tsame window) is "X" (X<1.0), and then th_diff may be set equal to X.

In other embodiments, the similarity condition is determined during the training phase by developing a pre-trained neural network based on the CFR samples. During the operational phase, CFR samples are applied to the pre-trained neural network, which outputs a result indicating the similarity condition is satisfied (no interferer is present) or not satisfied (an interferer is present). This example will be discussed later in connection with FIG. 6.

In still other embodiments, a training phase is omitted and the static time interval Tsame is predetermined, as is the similarity condition, where the predetermined value and condition may be based on the particular application.

Figure 2B:
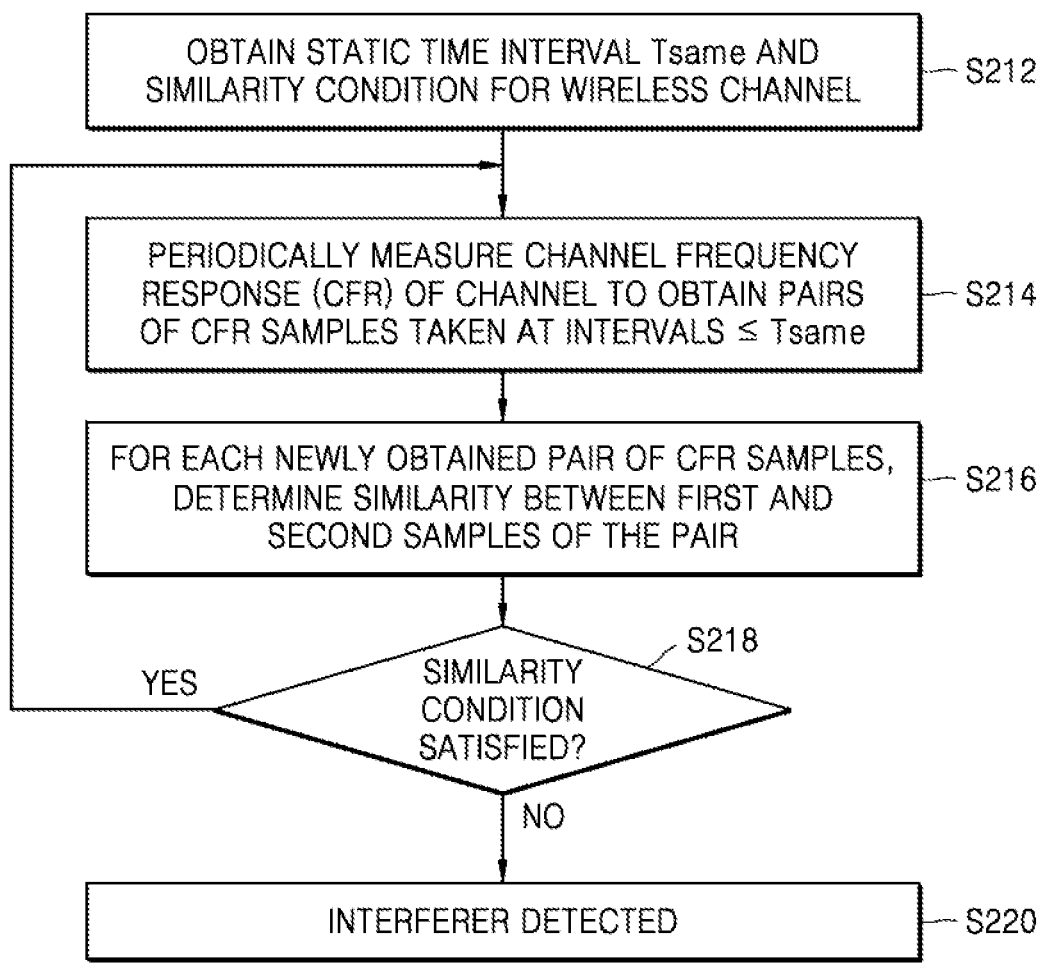
FIG. 2B is a flow diagram depicting example operations of an operational phase of a method of detecting an interferer, based on pairs of CFR samples taken within predetermined static time intervals, according to an embodiment.

FIG. 2B is a flow diagram of an operational phase of a method of detecting an interferer, based on pairs of CFR samples taken within predetermined static time intervals, according to an embodiment. The method may be performed by receiving device 120 or transmitting device 130. The following discussion describes receiving device 120 performing the interferer detection operations as an example. In other examples, transmitting device 130 may perform the interferer detection operations, e.g., based on channel information feedback signals transmitted by receiving device 120. The method will be explained with reference to the time diagram example of FIG. 3.

A predefined static time interval Tsame may be obtained (S212). Tsame may have been input by a system designer and read from memory of receiving device 120, or, determined from the training signal phase of the method as described above for FIG. 2A. Additionally, a similarity condition for deciding whether a static characteristic exists over Tsame may be obtained (S212). The similarity condition may have been determined from the operations of FIG. 2A described above and stored in memory.

Figure 3:
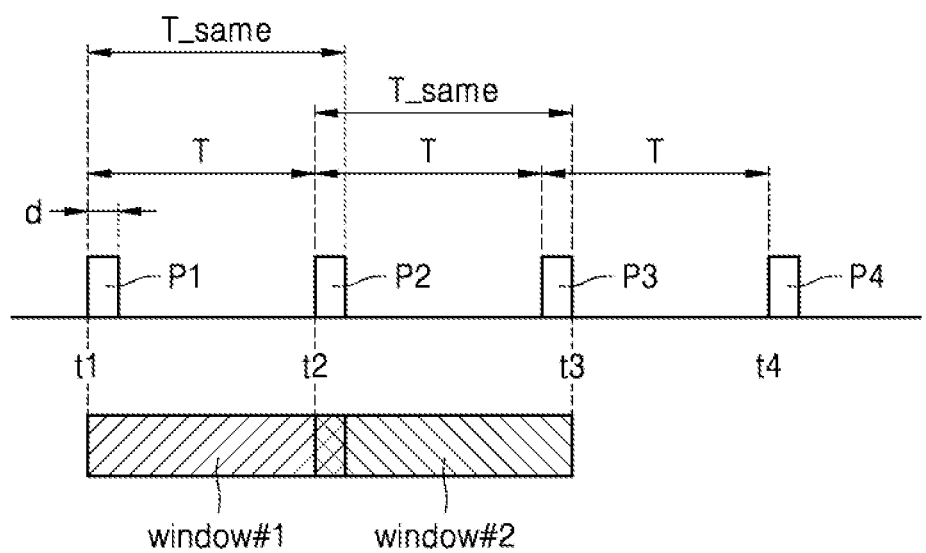
FIG. 3 is a timing diagram illustrating example CFR sampling periods and intervals therebetween according to an embodiment.

Channel frequency response of the propagation channel between devices 130 and 120 may then be periodically measured at receiving device 120 to obtain pairs of CFR samples taken at intervals ≤Tsame (S214). The CFR samples may be samples of pilot signals, control signals and/or traffic signals communicated between devices 130 and 120. For example, as shown in FIG. 3, a first CFR sample CFR(p1) is taken over a sampling period p1 beginning at time t1; a second CFR sample CFR(p2) is taken over a sampling period p2 beginning at time t2; and so on. A time duration "d" of each sampling period p1, p2 ... may be the same. A time interval T≤Tsame separates each successive pair of samples (e.g., T≈t2−t1), where "T" need not be the same from sample to sample. Each consecutive pair of CFR samples may be understood as taken within a sliding window. For example, the samples taken within periods p1 and p2 fall within window #1, which slides by (T−d) to become window #2, and the next consecutive pair of samples p2 and p3 fall within window #2.

For each newly obtained pair of CFR samples, a difference or similarity in CFR may be determined between the first and second samples of the pair to ascertain a degree of similarity between the samples (S216). The method then determines if the similarity is high enough to satisfy the similarity condition (S218). If not, the method detects that an interferer initiated an attack and thereby modified the wireless channel within the time between the first and second samples ("interferer detected") (S220). Otherwise, the flow may return to operation S214 and the monitoring for the presence of an interferer continues. As an example, in FIG. 3, if the CFR similarity between the first pair of CFR samples, as determined by a cross-correlation algorithm, is greater than or equal to $\gamma$, i.e., $$CFR(p2)*CFR(p1) \geq \gamma,$$

(where * denotes cross-correlation) then it may be determined that no interferer initiated an attack within window #1. In the evaluation of the next pair of CFR samples, if the CFR similarity is less than $\gamma$, then it may be determined that an interferer initiated an attack within the respective window. Thus, if:

$$CFR(p3)*CFR(p2) < \gamma,$$

then it may be determined that an interferer initiated an attack within window #2.

As described further below, in a nearest neighbor algorithm based embodiment (or other algorithm designed to find a closest result), the similarity condition may be a condition in which the metric M is closer to Msame than to Mdiff. If M is closer to Mdiff, an interferer is detected (the result is Y in S218); otherwise, an interferer is not detected. In another example, the similarity condition may be defined in terms of a supervised pre-trained neural network set, e.g., a set $y_0=0$, $y_1=1$ may be defined to represent a CFR pair is the same (similarity condition satisfied, no interferer detected); and a set $y_0=1$, $y_1=0$ may be defined to represent the CFR pair is different (similarity condition not satisfied, interferer is detected). This example will be discussed below in connection with FIG. 6.

Once an interferer has been detected, the communication system 100 may initiate any suitable countermeasure, which may include ceasing communications, changing operating frequencies, scrambling codes, alerting a security system to locate the interferer, etc.

It is noted here that the intervals "T" between the consecutive pairs of CFR sampling periods may differ slightly from pair to pair. For instance, due to variations in data traffic, packets for CFR measurements may only be transmitted intermittently. Accordingly, a target time for the interval T may be established, and each consecutive pair of CFR samples may be transmitted within a certain range of the target time. When the target time is designed properly to take an expected range of the variation into account, T may vary from sample to sample, but will always be less than Tsame.

Figure 4:
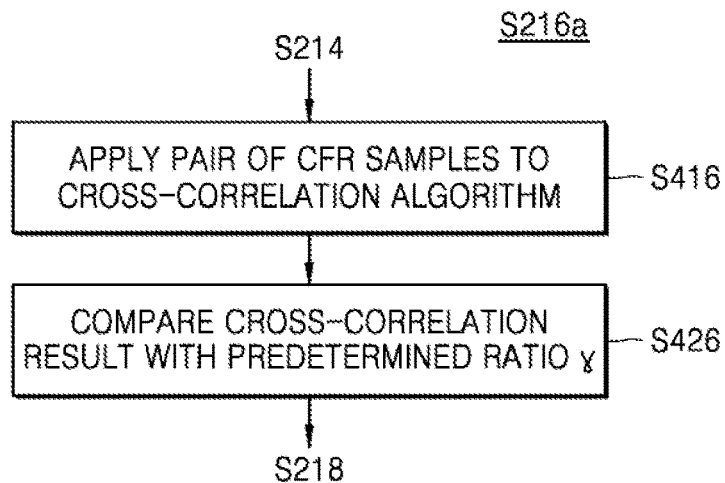
FIG. 4 depicts an example operation sequence for determining similarity in CFR between a pair of CFR samples using a cross-correlation algorithm.

FIG. 4 depicts an operational sequence, 216a, which is an example of operation 216 of FIG. 2B. This example determines similarity in CFR between a pair of CFR samples based on a cross-correlation algorithm, which is an algorithm that estimates similarity between two sets of data using cross-correlation. The operations of FIG. 4 may assume that the same or similar cross-correlation algorithm was used in the training phase of the interferer detection method of FIG. 2A. Thus, it may be assumed that in operation S208 of FIG. 2A, CFR similarity between consecutive samples was determined using a cross-correlation algorithm, and a similarity condition which, if satisfied, is indicative of a static characteristic throughout Tsame, may have also been developed using the cross-correlation algorithm.

In the sequence S216a, a pair of consecutive CFR samples (e.g., CFR(p1), CFR(p2)) may be applied to the cross-correlation algorithm (S416). A cross-correlation result of the algorithm may then be compared with a predetermined cross-correlation ratio $\gamma$ (threshold of the similarity condition) (S426). The flow then returns to S218 of FIG. 2B, which detects that an interferer initiated an attack within the time between the CFR samples if the cross-correlation result is less than $\gamma$; otherwise, the periodic measurements continue at S214.

The cross-correlation algorithm and comparisons for the interferer detection may be based on the following: the training phase may include operations of defining a channel observation (with time span $[t_0, t_1, \ldots, t_{N-1}]$ and frequency span $[f_0, f_1, \ldots, f_{K-1}]$) as a 2D data sample:

$$H([t_0,t_1,\ldots,t_{N-1}],[f_0,f_1,\ldots,f_{K-1}]) \in C^{N \times K},$$

where the short hand notation $H(t_0, T)$ means observation within time span $[t_0, t_0+T]$. If a uniform time sampling period is assumed as $\Delta T$, then $T=N\Delta T$. A special case $H(t_0, \Delta T)=h(t_0)$ may be used to represent a one dimensional (1D) data sample. Channel measurement data may be a sequence of 1D data samples $h(t_n)$, $$n=0,1,2,\ldots.$$

During the training phase (FIG. 2A, S206-208), hypothesis and test operations may be as follows: Channel continuity (alternatively referred to as a static channel condition or a slow moving channel condition, as noted earlier) may be tested without the presence of an interferer. A hypothesis may be tested with respect to a given $H(t_{na}, T)$ and $H(t_{nb}, T)$, to test that two are "the same" (which may be assumed if their cross-correlation is equal to or above a certain threshold) within a certain range of $|t_{nb}-t_{na}|$. A positive data set may be built up:

Positive set: $H(t_{na},T),H(t_{nb},T)\},\{|t_{nb}-t_{na}| \leq T_{same}\}$.

Here, $|t_{nb}-t_{na}|$ may be small enough to allow for a practical setting of Tsame as a window during which it is desirable to know when an interferer attack begins, such as in the tenths of a second range in an environment associated with pedestrian speeds.

The cross-correlation based detection technique may be implemented with a pair of just 1D data samples (each sample based on results for all K frequencies), one at the beginning of a window and one at the end, are compared. Cross-correlation between two "channel data" $h(t_{na})$ and $h(t_{nb})$ may be defined as $$c = \left| \frac{\sum_{k=0}^{K-1} h(t_{na})h^*(t_{nb})}{\|h(L_{na})\| \cdot \|h(L_{nb})\|} \right|$$

For example, $h(t_{na})$ and $h(t_{nb})$ may be consecutive samples of CFR measurements, such as CFR(p2) and CFR (p1), respectively, of FIG. 3. If $c \geq \gamma$ (e.g., operation 426 of FIG. 4), the two "channels" are similar, otherwise, the two channels are different. Here, $\gamma$ is the correlation threshold, $\|\cdot\|$ denotes the Euclidean norm, $|\cdot|$ denotes the absolute, and $(\cdot)^*$ denotes the conjugate.

Figure 5:
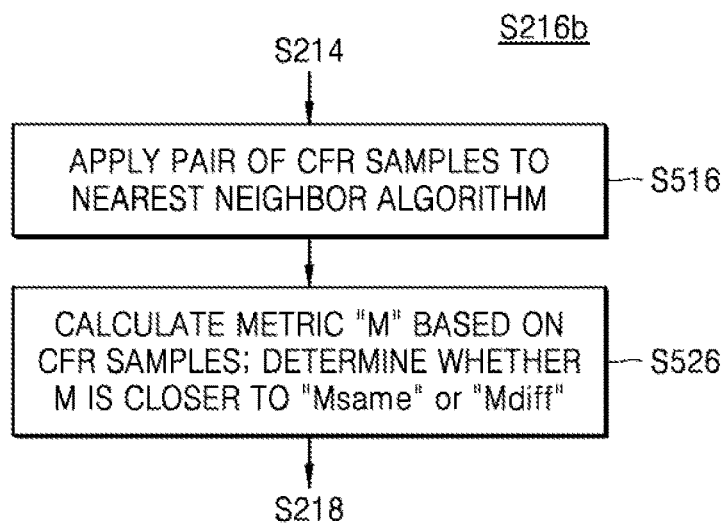
FIG. 5 depicts an example operation sequence for determining similarity in CFR between a pair of CFR samples using a nearest neighbor algorithm.

FIG. 5 illustrates another example operational sequence, 216b, for operation 216 of FIG. 2B. This example determines similarity in CFR between a pair of CFR samples based on a nearest neighbor algorithm. The operations of FIG. 5 may assume that the same or similar nearest neighbor algorithm was used in the training phase of the interferer detection method of FIG. 2A. Thus, it may be assumed that in operation S208 of FIG. 2A, CFR similarity between consecutive samples were determined using a nearest neighbor algorithm, and a similarity condition indicative of a static characteristic throughout Tsame was also developed using this algorithm.

In the sequence S216b, a pair of consecutive CFR samples (e.g., CFR(p1), CFR(p2)) may be applied to the nearest neighbor algorithm (S516). The nearest neighbor algorithm may calculate a metric M based on the CFR samples, and may determine whether M is closer to the metric Msame or to the metric Mdiff (S526). Msame and Mdiff may have been determined during the training phase or read from memory as predetermined values for the particular application. The similarity condition may be satisfied when M is closer to Msame. A result of the algorithm may then be output (e.g., a bit indicating that M is closer to Msame, or that M is closer to Mdiff), whereupon the operation S218 may detect that an interferer initiated an attack in the time between the CFR samples if M is closer to Mdiff.

An example of the nearest neighbor algorithm of S216b and the development of the metrics Msame and Mdiff are as follows:

To obtain Msame and Mdiff, during the training phase of FIG. 2A (operation S208), both a positive data set and a negative data may be built up:

Positive set: $\{H(t_{na},T), H(t_{nb},T)\}, \{|t_{nb}-t_{na}| \leq T_{same}\}$

Negative set: $\{H(t_{na},T), H(t_{nb},T)\}, \{T_{diff} \leq |t_{nb}-t_{na}|\}$, where $|t_{nb}-t_{na}|$ is small enough for the positive set and large enough for the negative set.

Msame and Mdiff may then be determined as:

$M_{same} = E_{\{|t_{nb}-t_{na}| \leq T_{same}\}}(M^{(t_{na},t_{nb})})$ $M_{diff} = E_{\{T_{diff} \leq |t_{nb}-t_{na}|\}}(M^{(t_{na},t_{nb})})$ where E(·) denotes expectation.

For the operational phase of the interferer detection method (FIG. 2B), a metric "M" may be measured to quantize the similarity between two "channels" (CFR samples) $H(t_{na}, T)$ and $H(t_{na}, T)$. Examples of M include a first metric based on cross-correlation and a second metric based on the difference between the absolute value of the two channels.

The first metric may be defined for 1D data or 2D data. For example, the first metric defined for 1D data may be as follows:

$$M = M_{xc}^{(t_{na},t_{nb})} = \left| \frac{\sum_{k=0}^{K-1} h(t_{na}) h^*(t_{nb})}{\|h(t_{na})\| \cdot \|h(t_{nb})\|} \right|$$

The second metric may be defined for 2D data as follows:

$$M = M_{abs-diff}^{(t_{na},t_{nb})} = \frac{1}{KN} \sum_{n=0}^{N-1} \sum_{k=0}^{K-1} \|H(t_{na}, N\Delta T)\| - \|H(t_{nb}, N\Delta T)\|$$

For 1D data, the second metric reduces to:

$$M = M_{abs-diff}^{(t_{na},t_{nb})} = \frac{1}{K} \sum_{k=0}^{K-1} \||h(t_{na})| - |h(t_{nb})|\|$$

During the operational phase, the classification for a two-channel-pair with metric $M=M^{(t_{na}, t_{nb})}$ (either one of the first or second metrics above) can be made as follows:

decision is "the same" when $|M^{(t_{na},t_{nb})} - M_{same}| \leq |M^{(t_{na},t_{nb})} - M_{diff}|$;

decision is "different" when $|M^{(t_{na},t_{nb})} - M_{same}| > |M^{(t_{na},t_{nb})} - M_{diff}|$ where decision "different" results in an interferer detected at S220 of FIG. 2B, and decision "the same" returns the method flow to S214.

Figure 6:
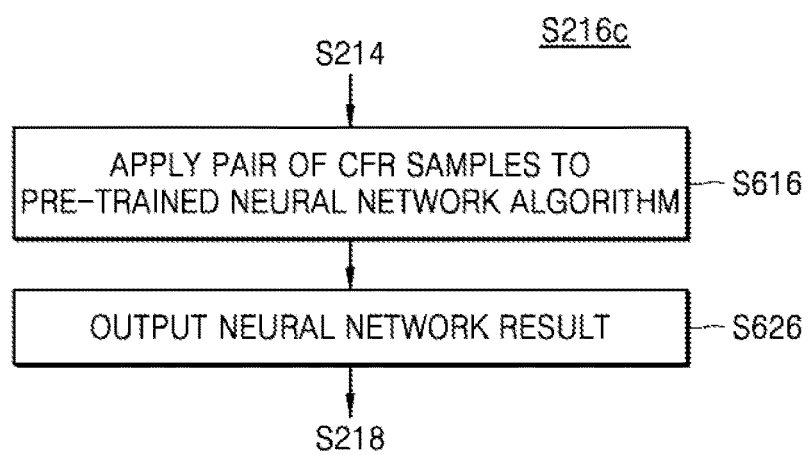
FIG. 6 depicts an example operation sequence for determining similarity in CFR between a pair of CFR samples using a pre-trained neural network.

FIG. 6 illustrates a further example operational sequence, 216c, for operation 216 of FIG. 2B. This example determines similarity in CFR between a pair of CFR samples based on a neural network algorithm. The operations of FIG. 6 may assume that the same or similar neural network algorithm was used in the training phase of the interferer detection method of FIG. 2A. Thus, it may be assumed that in operation S208 of FIG. 2A, CFR similarity between consecutive samples were determined using a neural network algorithm, and a similarity condition indicative of a static characteristic throughout Tsame was also developed using this algorithm.

In the sequence S216c, a pair of consecutive CFR samples (e.g., CFR(p1), CFR(p2)) may be applied to the neural network algorithm (S616), i.e., a pre-trained neural network. The neural network may output a result indicating whether the similarity condition is satisfied or not (S526). The flow then returns to S218 of FIG. 2B, which detects that an interferer initiated an attack in the time between the CFR samples if the result indicates the similarity condition is not satisfied.

An example of the neural network algorithm approach of operation S216c is as follows: A neural network structure may have multiple layers, e.g., three layers in the following example. The input and output of a layer may be described as $a_{j_{l+1}}^{(l+1)} = f^{(l+1)}(\sum_{j_l=0}^{M_l-1} W_{j_{l+1},j_l}^{(l)} a_{j_l}^{(l)} + b_{j_{l+1}}^{(l)}), l \in [0,1]$ where $M_l$ denotes the number of neurons in the lth layer (e.g., the $0^{th}$ layer is the input layer in which $M_0 = KN$ where K is the number of frequencies and N is the number of samples taken at different times; the $1^{st}$ layer is the hidden layer in which $M_1=4$; and the $2^{nd}$ layer is the output layer in which $M_2=2$). $j_l$ ($j_l \in [0, M_l-1]$) is the index of the neuron in the l-th layer, and $a_{j_l}^{(l)}$ is the output from $j_l$-th neuron in the l-th layer. $W_{j_{l+1},j_l}^{(l)}$ is the weighting associated with the connection between the $j_l$-th neutron in the l-th layer and the $j_{l+1}$-th neuron in the (l+1)-th layer. $b_{j_{l+1}}^{(l)}$ is the bias associated with the $j_{l+1}$-th neutron in the (l+1)-th layer. $f^{(l)}(\cdot)$ is the activation function for the neuron in the l-th layer. The activation function of the hidden layer may be the rectified linear unit (ReLU), $f^{(1)}(x) = \max(0, x)$. No activation function may be used for the input and output layer, and $f^{(0)}(x) = f^{(2)}(x) = x$.

The input of the neural network may be $a_{j_0}^{(0)} = x_{n,k}$, where $n = \mod(j_0, N), k = \left\lfloor \frac{j_0}{N} \right\rfloor, j_0 \in [0, NK-1]$, and $x_{n,k}$ is defined as:

$x_{n,k} = \||H(t_{na},N\Delta T)| - |H(t_{nb},N\Delta T)|\|, n \in [0,N-1], k \in [0,K-1]$.

A desired output (label) may be $\hat{y}_i = a_{j_2}^{(2)}$ ($i=j_2 \in [0,1]$), and the set $y_0=0$, $y_1=1$ may be defined to represent the two channels are the same (similarity condition is satisfied, no interferer detected, similarity condition is satisfied); the set $y_0=1$, $y_1=0$ may be defined to represent the two channels are different (similarity condition is not satisfied, interferer is detected).

A loss function and optimization of the neural network may be as follows: Actual output of the neural network may be $\hat{y}_i$, where an optimization algorithm is used to minimize a softmax cross entropy loss function defined with or without regularization below.

Without regularization, the loss function may be defined as:

$$L_{without\_regularisation} = \frac{1}{M_2}\sum_{i=0}^{M_2-1} -y_i\log(\text{softmax}(\hat{y}_i)) - (1-y_i)\log(1-\text{softmax}(\hat{y}_i))$$

where $$\text{softmax}(\hat{y}_i) = \frac{e^{\hat{y}_i}}{\sum_{i=0}^{M_2-1} e^{\hat{y}_i}}.$$

With regularization, the loss function may be defined as:

$$L_{with\_regularisation} = L_{without\_regularisation} + \beta r$$

where r is the regularization term defined as (L2 regularization):

$$\frac{1}{2}\left(\sum_{j_2=0}^{M_2-1}\sum_{j_1=0}^{M_1-1}(W^{(1)}_{j_2 j_1})^2 + \sum_{j_2=0}^{M_2-1}(b^{(1)}_{j_2})^2\right),$$

where $\beta$ denotes a scaling factor (e.g., $\beta$ may be on the order of 0.01). The regularization may be used to overcome overfitting during training.

A predetermined number of samples (each with size KN) may define a batch size. A batch of samples may be fed into the neural network for each training iteration. The procedure of feeding all available training data into the neural network is referred to as a training epoch which may include multiple training iterations.

Combinations of at least two of the approaches of FIGS. 4, 5 and 6 using the cross-correlation algorithm, the nearest neighbor algorithm and the neural network algorithm may also be implemented in other embodiments.

Figure 7:
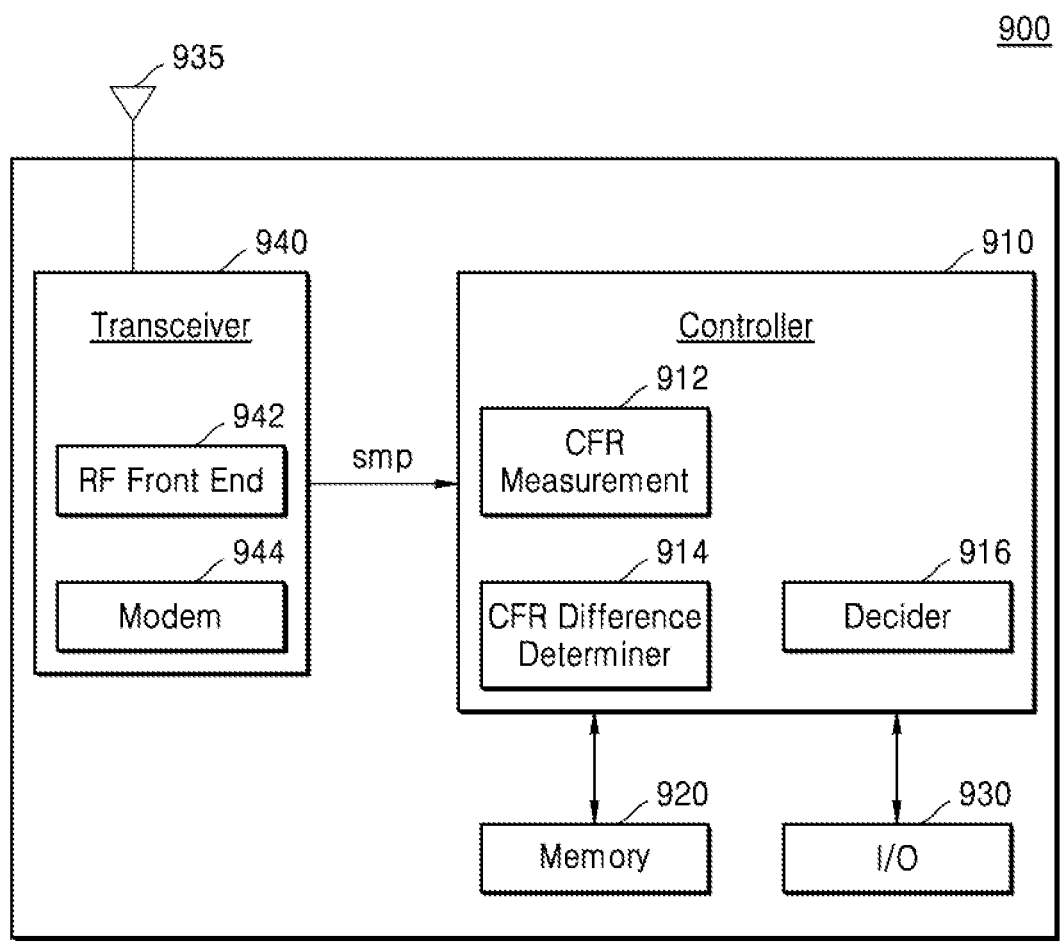
FIG. 7 is a functional block diagram depicting example blocks of circuitry within a wireless device that may be used in the wireless communication system according to an embodiment.

FIG. 7 is a functional block diagram depicting example blocks of circuitry within a wireless device 900, which is an example of receiving device 120 and/or transmitting device 130 described above. Wireless device 900 may include one or more antennas 935, a transceiver 940, a controller 910, memory 920 and an input/output (I/O) unit 930. Transceiver 940 may include an RF front end 942 and a modem 944. Controller 910 may include a CFR measurement block 912, a CFR difference/similarity determination block 914 and a decider block 916. Controller 910 may include a processor that executes instructions read from memory 920 to carry out the above-described operations, such as those of FIGS. 2A, 2B, 4, 5 and/or 6. When wireless device 900 is configured as a receiving device, transceiver 940 may process the training signals, received by and routed from antenna 935, described above in connection with FIG. 2A. Transceiver 940 may output the processed signals as digital samples smp to controller 910. The digital samples smp may be processed by CFR measurement block 912 to provide CFR samples. CRF difference determination block 914 may compare pairs of the CFR samples as described above and provide CFR difference/similarity results to decider 916. Decider 916 may determine whether an interferer is detected by determining whether the similarity condition is satisfied or not, based on the CFR difference/similarity results as described above. I/O block 930 may receive user inputs to set values such as Tsame and Tdiff and values for any other variables not set as defaults.

Embodiments of the inventive concept such as those described above may exhibit several advantages over conventional methods. For instance, embodiments do not require modification of existing wireless communication protocols. On the other hand, new training sequences are required in [3] and [5], and additional signaling procedure is required in [4]. Additionally, embodiments may be designed for both pilot contamination and pilot jamming categories, and thus the technique does not need to know which category the interferer operates. Moreover, the inventive concept is applicable to both single and multiple antenna systems, whereas some conventional methods (e.g., [4]) require multiple antennas.

Example embodiments of the inventive concept have been described herein with reference to signal arrows, block diagrams (e.g., the flowcharts of the methods of FIG. 2A, 2B, 4, 5 or 6 and the block diagram for controller 910 in FIG. 7). Each block of the block diagrams (e.g., any of operations S202-S220, S416-S626 or any of the blocks 912, 914 and 916 of controller 910) and combinations of blocks in the block diagrams, and operations according to algorithmic expressions can be implemented by circuitry (e.g., processing circuitry of controller 910 in cooperation with memory 920) accompanied by computer program instructions. Such computer program instructions may be stored in a non-transitory computer readable medium (e.g., memory 920) that can direct a computer, other programmable data processing apparatus, or other devices to function in a particular manner, such that the instructions stored in the computer readable medium produce an article of manufacture including instructions which implement the function/act specified in the block diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

REFERENCES

[1] X. Zhou, B. Maham, A. Hjørungnes, "Pilot Contamination for Active Eavesdropping," *IEEE Trans. Wireless Commun.*, vol. 11, no. 3, pp. 903-907, March 2012.

[2] G. T. Amariucai and S. Wei, "Half-Duplex Active Eavesdropping in Fast-Fading Channels: A Block-Markov Wyner Secrecy Encoding Scheme," *IEEE Trans. Inform. Theory*, vol. 58, no. 7, pp. 4660-4677, July 2012.

[3] D. Kapetanovic, G. Zheng and F. Rusek, "Physical Layer Security for Massive MIMO: An Overview on Passive Eavesdropping and Active Attacks," *IEEE Commun. Mag.*, vol. 53, pp. 21-27, February 2014.

[4] Q. Xiong, Y.-C. Liang, K. H. Li and Y. Gong, "An Energy-Ratio-Based Approach for Detecting Pilot Spoofing Attack in Multiple-Antenna Systems," *IEEE Trans. Inf. Forensics Security*, vol. 10, no. 5, pp. 932-940, December 2015.

[5] H.-M. Wang, K.-W. Huang and T. A. Tsiftsis, "Multiple Antennas Secure Transmission Under Pilot Spoofing and Jamming Attack," *IEEE J. Sel. Areas Commun.*, vol. 36, no. 4, pp. 860-876, April 2018.

What is claimed is:

1. A method for detecting a modification, due to an interferer, of a wireless channel between a transmitting device and a receiving device, comprising:
    measuring first and second samples of channel frequency response (CFR) of the wireless channel within a time interval less than or equal to a pre-established static time interval throughout which the wireless channel is expected to exhibit a static characteristic corresponding to a slowly changing channel in an environment without any interferer; and
    detecting that the interferer has modified the wireless channel when a similarity condition reflecting a degree of similarity between the first and second CFR samples is not satisfied,
    wherein the pre-established static time interval is defined at least in part based on a maximum Doppler shift of signals reflected from an expected number of objects each expected to move over a range of speeds within the wireless channel between the transmitting and receiving devices.

2. The method of claim 1, wherein the static characteristic is defined further based on a maximum speed at which the transmitting device is expected to move with respect to the receiving device in the environment.

3. The method of claim 1, further comprising determining, by the receiving device, the similarity condition in a training procedure under an assumption that no interferer is present, by analyzing characteristics of training signals transmitted from the transmitting device and received by the receiving device.

4. The method of claim 3, further comprising determining, by the receiving device, the pre-established time interval during the training procedure based on the received training signals.

5. The method of claim 1, wherein the similarity condition is a condition in which cross-correlation between consecutive CFR samples is greater than or equal to a predetermined threshold.

6. The method of claim 1, wherein the similarity condition is based on a nearest neighbor algorithm.

7. The method of claim 6, wherein the nearest neighbor algorithm determines:
    if the difference between the first and second CFR samples is closer to a second metric than to a first metric, the interferer is detected to have modified the channel, wherein the first metric represents a CFR difference expectation for the wireless channel in the absence of an interferer, and the second metric represents a CFR difference expectation for the wireless channel in the presence of an interferer.

8. The method of claim 1, wherein the similarity condition is a condition of a pre-trained neural network.

9. The method of claim 1, wherein the measuring of the first and second samples is performed by the receiving device measuring characteristics of pilot or control signals transmitted by the transmitting device.

10. The method of claim 9, wherein the pilot or control signals are signals of a local area network standard.

11. The method of claim 1, wherein the measuring of the first and second samples is performed by the receiving device measuring characteristics of data traffic packets transmitted by the transmitting device.

12. The method of claim 1, wherein the measuring of the first and second samples is performed by the transmitting device measuring characteristics of channel information feedback signals transmitted by the receiving device.

13. A receiving device comprising:
    at least one antenna;
    a transceiver; and
    at least one processor configured to detect a modification, due to an interferer, of a wireless channel between a transmitting device and the receiving device, the processor executing instructions read from a memory to:
    measure, based on digital signals provided from the transceiver derived from wireless signals received by the at least one antenna, first and second samples of channel frequency response (CFR) of the wireless channel within a time interval less than or equal to a pre-established static time interval throughout which the wireless channel is expected to exhibit a static characteristic corresponding to a slowly changing channel in an environment without any interferer; and
    detect that the interferer has modified the wireless channel when a similarity condition reflecting a degree of similarity between the first and second CFR samples is not satisfied,
    wherein the pre-established static time interval is determined at least in part based on a maximum Doppler shift of signals reflected from an expected number of objects each expected to move over a range of speeds within the wireless channel between the transmitting and receiving devices.

14. The receiving device of claim 13, wherein the receiving device is one of a slave device or a master device in a local area network.

15. The receiving device of claim 13, wherein the receiving device is one of a station (STA) or an access point (AP) in a communication system based on a local area network standard.

* * * * *